P. DERKUM.
DEVICE FOR TRANSMITTING MOTION.
No. 192,155.    Patented June 19, 1877.
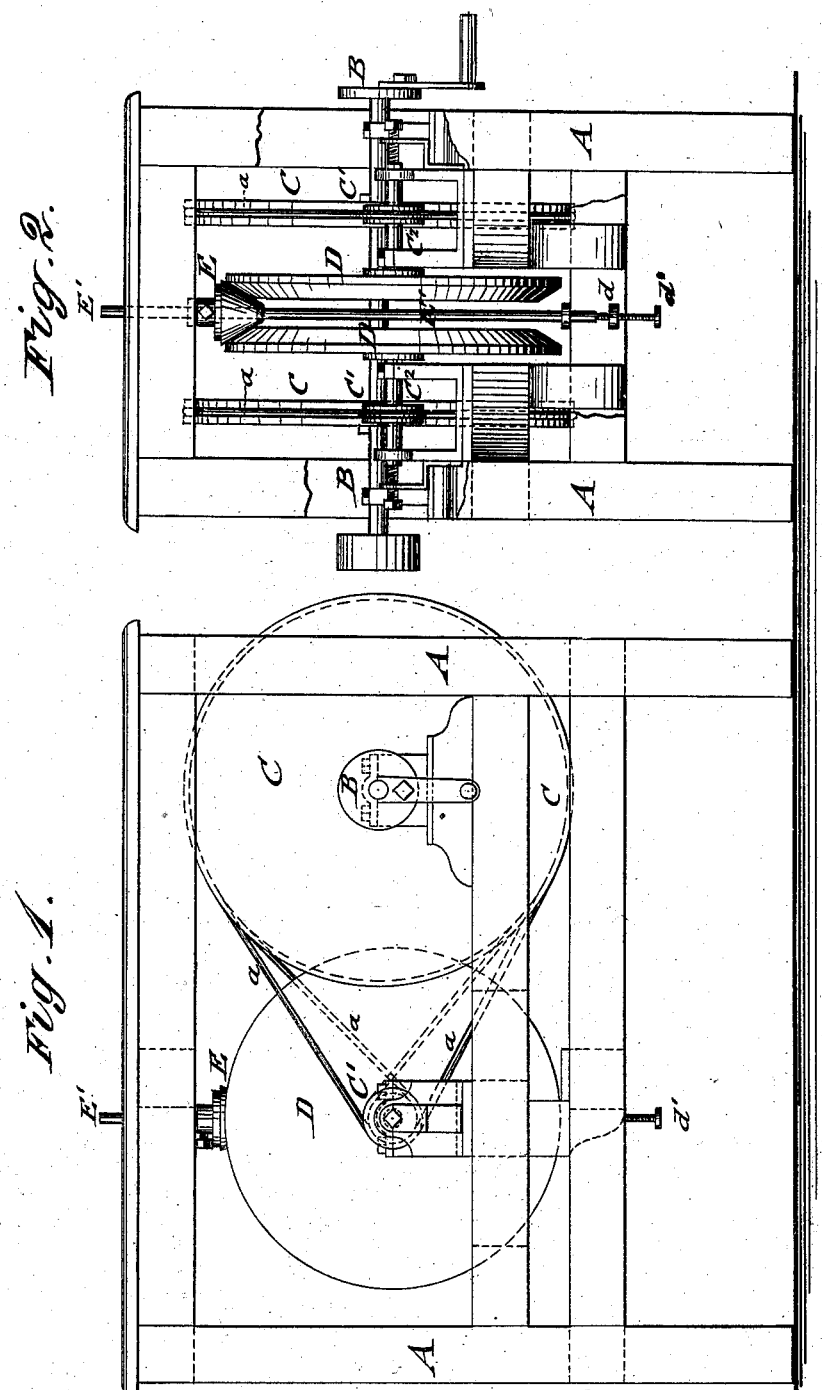
WITNESSES:    INVENTOR:

UNITED STATES PATENT OFFICE.

PETER DERKUM, OF RICHMOND, INDIANA.

IMPROVEMENT IN DEVICES FOR TRANSMITTING MOTION.

Specification forming part of Letters Patent No. 192,155, dated June 19, 1877; application filed March 12, 1877.

*To all whom it may concern:*

Be it known that I, PETER DERKUM, of Richmond, in the county of Wayne and State of Indiana, have invented a new and Improved Device for Transmitting Motion, of which the following is a specification:

In the accompanying drawing, Figure 1 represents a side elevation, and Fig. 2 an end view, with parts broken off, of my improved device for transmitting motion.

Similar letters of reference indicate corresponding parts.

The object of this invention is to provide an improved device or mechanism for transmitting motion from a horizontal crank-shaft to a vertical shaft, to be used for working molding and other machines in which a steady and continuous motion is required.

The invention consists of a revolving shaft with double driving-wheels, which are connected by a straight and cross belt with pulleys of separate shafts, transmitting the power from the same by friction-disks with beveled edges to a conical pulley of a vertical revolving shaft, to which the molding-knives or other working devices are attached.

In the drawing, A represents the supporting-frame; B, a lateral crank-shaft turning in bearings of frame A, and C are two large driving-wheels that are keyed to shaft B. The revolving wheels C impart, by a straight and cross belt, $a$, revolving motion, but in opposite direction, to pulleys $C^1$ of separate and shorter shafts $C^2$, that turn in separate bearings of frame A. To the inner ends of the shafts $C^2$ are secured the disks D, while set-screws $b$ are applied to the outer ends of the shafts $C^2$ for the purpose of adjusting the disks nearer to or farther from each other, according to the degree of friction to be exerted by the beveled edges of the disks on the conical pulley of a vertical shaft, E'.

The disks revolve in opposite direction and impart a perfectly steady and continuous revolving motion to the upright shaft E', which turns at the lower end on a suitable step, $d$, with set-screw $d'$, and in a bearing at the top part of the frame. The conical friction-pulley is clamped in adjustable manner to the shaft E', to provide for the wear of the contact-surfaces of disks and pulley.

The device forms a superior power-transmitting mechanism for molding and other machines by the smooth, steady, and uniform revolving motion that is given to the vertical shaft.

Having thus described my invention, I claim as new and desire to secure by Letters Patent—

A device for transmitting motion from a horizontal to a vertical revolving shaft, consisting of a revolving crank-shaft, B, with wheels C, that impart, by connecting belts and pulleys, revolving motion, but in opposite direction, to disks D, with beveled edges, and thereby continuous revolving motion to a conical friction-pulley, E, and a vertical shaft, E', substantially in the manner set forth.

PETER DERKUM.

Witnesses:
HENRY FOSSANKEMPER,
PARK PAGE.